(12) United States Patent
Hir

(10) Patent No.: US 8,402,134 B1
(45) Date of Patent: Mar. 19, 2013

(54) SYSTEM AND METHOD FOR LOCATING LOST ELECTRONIC DEVICES

(75) Inventor: Stephane Le Hir, Suresnes (FR)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/323,055

(22) Filed: Dec. 12, 2011

(51) Int. Cl.
G06F 15/173 (2006.01)

(52) U.S. Cl. .......................... 709/224; 726/7; 455/456.1

(58) Field of Classification Search .................. 709/224; 726/7, 4, 21; 455/456.1
See application file for complete search history.

(56) References Cited

U.S. PATENT DOCUMENTS

| | | | |
|---|---|---|---|
| 6,950,946 B1 | 9/2005 | Droz et al. | |
| 7,496,201 B2 | 2/2009 | Westin | |
| 7,826,845 B2* | 11/2010 | Chen | 455/435.3 |
| 2003/0005092 A1 | 1/2003 | Nelson et al. | |
| 2003/0126462 A1* | 7/2003 | Howard et al. | 713/200 |
| 2003/0153328 A1* | 8/2003 | Booth et al. | 455/456 |
| 2005/0216757 A1 | 9/2005 | Gardner | |
| 2006/0233179 A1 | 10/2006 | Estrada et al. | |
| 2006/0276175 A1 | 12/2006 | Chandran | |
| 2009/0313686 A1* | 12/2009 | Wilson et al. | 726/7 |
| 2010/0115092 A1 | 5/2010 | Westin | |
| 2010/0229220 A1* | 9/2010 | Tsai | 726/4 |
| 2011/0057797 A1* | 3/2011 | Parker et al. | 340/568.1 |
| 2011/0076949 A1* | 3/2011 | Smith | 455/41.2 |

FOREIGN PATENT DOCUMENTS

| | | |
|---|---|---|
| EP | 1684535 A1 | 7/2006 |
| EP | 2051473 A1 | 4/2009 |
| WO | 2007069263 A2 | 6/2007 |
| WO | 2007109366 A2 | 9/2007 |

OTHER PUBLICATIONS

European Search Report in EP 11194737; Mar. 30, 2012; 6 pages.

* cited by examiner

*Primary Examiner* — Kyung H Shin
(74) *Attorney, Agent, or Firm* — Arent Fox LLP; Michael Fainberg

(57) ABSTRACT

Disclosed are systems, methods and computer program products for locating lost or stolen electronic devices. The method comprises deploying software agents on a plurality of networked electronic devices; receiving by a software agent deployed on a first electronic device a message from a remote server, the message including an identifier of a lost or stolen electronic device; searching by the software agent on a network to which the first electronic device is connected for the lost or stolen electronic device using the device identifier; if the lost or stolen electronic device is located on the network, collecting information about the lost or stolen electronic device; and transmitting by the software agent the collected information to one of the central server or an owner of the lost or stolen electronic device.

17 Claims, 10 Drawing Sheets

Interface: 172.16.8.91 --- 0x2
Internet Address      Physical Address       Type
172.16.0.1            00-1f-ca-97-6c-c7      dynamic
172.16.2.39           90-e6-ba-25-8a-38      dynamic
172.16.2.142          00-1e-8c-13-04-8c      dynamic
172.16.2.224          00-1e-8c-8f-b9-7e      dynamic
172.16.2.248          00-26-18-b0-75-7b      dynamic
172.16.6.166          00-0c-29-ef-e3-2d      dynamic
172.16.8.145          20-cf-30-27-68-dc      dynamic
172.16.8.157          00-15-5d-04-38-1b      dynamic
172.16.9.31           90-e6-ba-25-24-28      dynamic
172.16.9.40           00-15-5d-04-de-01      dynamic
172.16.9.60           00-15-5d-04-38-02      dynamic
172.16.9.118          00-15-5d-04-de-02      dynamic
172.16.9.137          00-50-56-80-0b-e8      dynamic
172.16.9.217          00-0c-29-4c-4c-23      dynamic
172.16.9.236          00-0c-29-fa-00-e2      dynamic
172.16.10.181         00-17-31-4b-e5-68      dynamic
172.16.128.59         00-0c-29-7b-7e-8a      dynamic
172.16.128.118        e0-cb-4e-a1-df-67      dynamic
172.16.128.144        00-0c-29-4e-94-47      dynamic
172.16.128.182        08-00-27-60-8e-fc      dynamic
172.16.128.185        00-13-d4-06-b5-b7      dynamic
172.16.128.230        e0-cb-4e-a9-7a-90      dynamic
172.16.129.19         08-00-27-e0-7c-0a      dynamic
172.16.129.161        00-23-54-65-ef-fc      dynamic
172.16.129.184        00-23-54-14-5f-9e      dynamic
172.16.130.4          00-50-56-80-01-49      dynamic
172.16.130.122        00-0c-29-41-27-28      dynamic
172.16.130.209        00-0c-29-e3-1a-96      dynamic
172.16.131.122        00-15-5d-04-de-08      dynamic
172.16.131.226        00-50-56-80-25-b4      dynamic
172.16.132.107        08-00-27-55-ff-93      dynamic
172.16.132.109        00-0c-29-af-31-cf      dynamic
172.16.132.112        08-00-27-14-0d-39      dynamic
172.16.132.157        00-50-56-80-31-73      dynamic
172.16.132.249        20-cf-30-4c-41-8e      dynamic
172.16.133.21         00-50-56-80-3e-08      dynamic
172.16.133.156        00-0c-29-bd-ef-02      dynamic
172.16.133.205        00-0c-29-bb-ae-c4      dynamic

Fig. 4

SYSTEM AND METHOD FOR LOCATING LOST ELECTRONIC DEVICES

TECHNICAL FIELD

The present disclosure relates generally to the field of computer security and, in particular, to systems, methods and computer program products for locating lost or stolen electronic devices connected to wired or wireless networks.

BACKGROUND

Mobile electronic devices are an integral part of modern life. Notebooks, netbooks, tablet computers, smart phones and other portable devices comprise more than half of all computers produced worldwide. People use them to communicate, work, relax, and study. The memory in these devices store large amounts of personal data such as contacts, photographs, videos, authorization information, and much more. Corporate computers also contain official correspondence and documentation, which may include trade secrets.

These mobile electronic devices are often targets for theft or robbery. Criminals can have various objectives: to gain access to a computer's hard drive, to sell the computer, or, rarely, to use it themselves. Portable devices are easily lost due to their size and the fact that they are constantly moved around by the user.

Society is faced with the critical issue of locating and returning lost or stolen devices. If mobile technology permits mobile devices to be identified centrally by network operators, then the architecture of Ethernet, Wi-Fi, Bluetooth, and other packet-switched transfer networks complicates the search for such a connected device.

Technology already exists that locates lost devices connected to the Internet using specially installed hardware or software agents. These modules communicate their location to the owner upon connection to the Internet.

The aforementioned technology has clear client-server architecture and stop functioning with the failure of one of the system components: client, server, or data transmission channel. Thus, if the operating system of the stolen devices is reinstalled or its hard drive or memory card is replaced, it becomes almost impossible to find the stolen device.

The present invention eliminates the described deficiencies of prior art by taking a different approach by which electronic devices are configured to search for lost or stolen devices in their networks. If a device is stolen and a detection agent necessary for a return connection with the server is blocked or removed, this device may be found by other devices, which will discover the lost or stolen device when it connects to the network.

SUMMARY

Disclosed are systems, methods and computer program products for locating lost or stolen electronic devices. In one example embodiment, a method for locating lost or stolen electronic devices comprises deploying software agents on a plurality of networked electronic devices; receiving by a software agent deployed on a first electronic device a message from a remote server, the message including an identifier of a lost or stolen electronic device; searching by the software agent on a network to which the first electronic device is connected for the lost or stolen electronic device using the device identifier; if the lost or stolen electronic device is located on the network, collecting information about the lost or stolen electronic device; and transmitting by the software agent the collected information to one of the central server or an owner of the lost or stolen electronic device.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings:

FIG. 4 illustrates an example of an ARP table in accordance with one example embodiment of the present invention;

DETAILED DESCRIPTION OF EXAMPLE EMBODIMENTS

Figure 1:
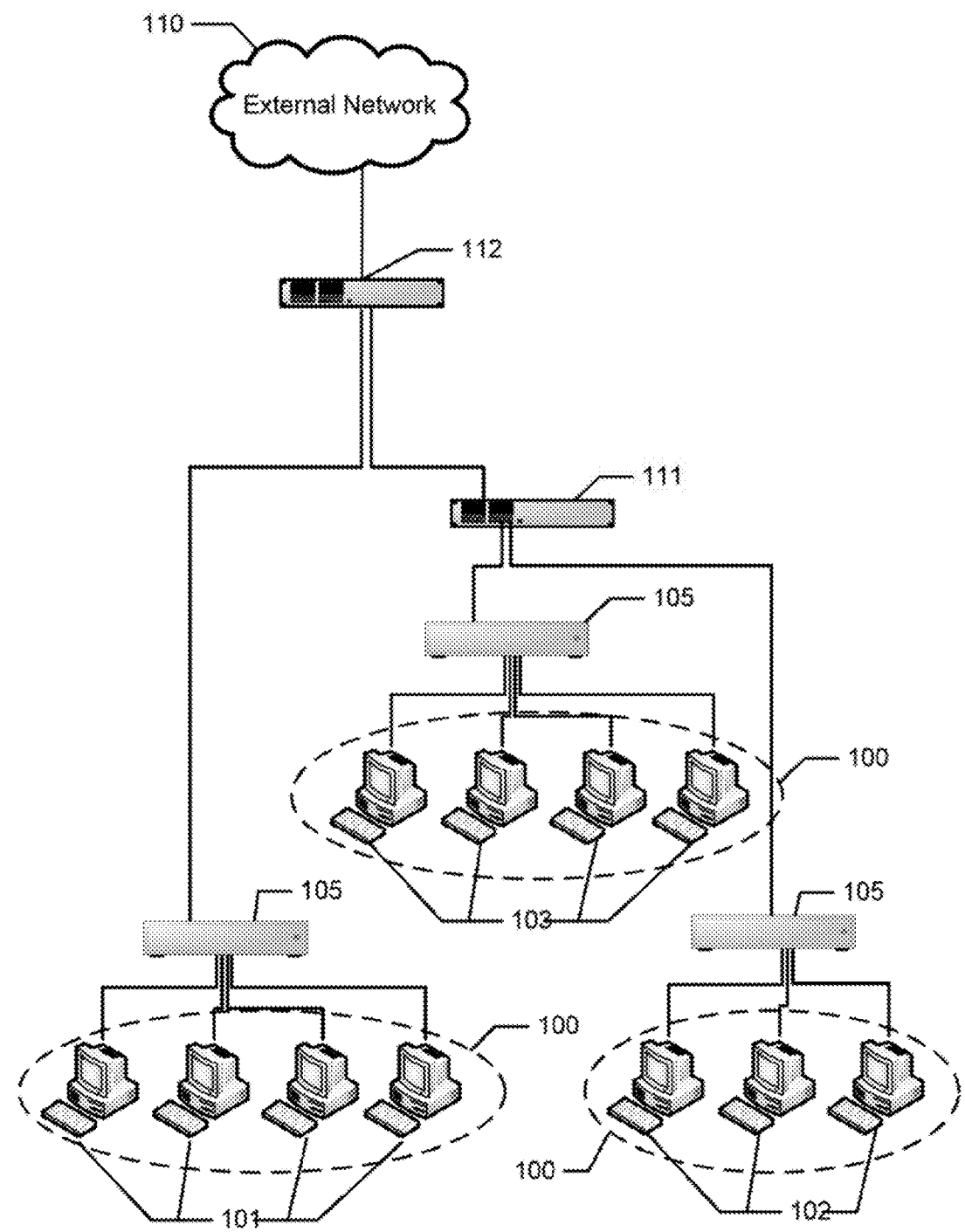
FIG. 1 illustrates one example of a local network comprised of several segments.

Example embodiments of the present invention are described herein in the context of systems, methods and computer program products for locating lost or stolen electronic devices. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

One of the main trends in information technology is the increase in network coverage for high-speed Internet access. With the growth in the popularity of mobile devices such as mobile phones, smart phones, tablet computers, and PDAs, there is an increase in the demand for universal access to the global network: electronic mail, websites, and other services. Access is obtained through local computer networks, such as local personal area network (LPAN), local area network (LAN), local wireless area network (LWAN), etc. There are multiple technologies for wired and wireless connection of network devices, the most popular of which are Ethernet, Wi-Fi, Wi-MAX, Bluetooth, etc.

Local networks are divided into open (public) or private networks based on their access isolation. Open networks allow all devices to connect while private networks use restricted access systems.

Wired networks require that a cable be connected to the device and are mainly used for corporate computer networks or large local networks. Wireless technologies are frequently used in public locations such as restaurants, shopping centers, and municipal access points. Their popularity grows daily, and there are more and more Wi-Fi access points (hotspots) with an open infrastructure.

Just because a computer or mobile device is active on a network, it does not always mean that this computer or device has access to information about the topology of the network or its other users. Networks differ on this characteristic due to different network architectures including the use of different types of network devices. Various implementations of the technology effectively detect devices on all types of networks. Detection is performed in a network neighborhood containing all devices connected to the client in a general data transmission network and all devices detected by the client as a result of the interception of network data packets. Thus, if a portable device is connected to a wired local network and has an active wireless adapter, then this device's network neighborhood comprises all devices on the local network and all devices detected in network packets intercepted by the wireless adapter. To increase the coverage of a network neighborhood, local networks may be created by clients, for example, using wireless adapters.

FIG. 1 gives an example of a local network comprised of several segments 100. Computers 101, 102, and 103 from individual segments are connected by network devices using the transport or data link layers of the OSI reference model, for example, switches 105. FIG. 1 depicts three segments 100, which contain computers noted on the Fig. under numbers 101 (first segment), 102 (second segment), and 103 (third segment). The segments are connected and share information through two routers 111. According to this schematic, the external network 110 is entered through a router 112. If we talk about identifying computers using the network card's physical address, they may be identified by computing devices in the same segment, for example, devices under numbers 103 can learn each other's MAC address within standard network settings.

There are many methods for identifying computer devices. A particular computer may be identified using authentication programs, application serial numbers, or account records. This invention uses identifiers, which are the most difficult to eliminate, hide, or replace. These include the physical address of the network interface (MAC address), BIOS serial number, hard drive serial number, and the computer's hardware configuration. These parameters are the most reliable, because they do not change when formatting the hard drive (deleting data). During formatting, data such as the operating system, account records, special applications, etc, are lost.

The parameters reviewed above cannot identify a computer with 100% certainty, because the hard drive can be replaced, thereby changing a computer's configuration. The BIOS serial number and MAC address can be changed using special utility programs. However, statistics show that a very small percentage of users, including criminals, resort to these changes. This preserves the positive effect of discovering lost devices using the mentioned identifiers.

The MAC address is a unique identifier assignable to each network interface. The majority of DLL (data link level) network protocols use one of the three MAC address spaces managed by the IEEE [Institute of Electrical and Electronics Engineers]: MAC-48, EUI-48, and EUI-64. In each of these spaces, the address is theoretically unique globally. Not all protocols use a MAC address, and not all protocols that use a MAC address need these addresses to be unique. In broadcast networks, the MAC address uniquely identifies each node of the network so that data is delivered only to this node. Thus, MAC addresses are the basic network parameters on the data link level, which is used by protocols on higher (network) levels. MAC-48 addresses are the most widespread. They are used in technologies, such as Ethernet, Token ring, FDDI, WiMAX, etc. They consist of 48 bits. Thus, the MAC-48 address space has 248 (or 281,474,976,710,656) addresses.

The MAC address is changed in software, because the value indicated by the driver has higher priority than hardwired on the network adapter. The MAC address can be replaced in Windows using built-in operating system features. However, there is still equipment whose MAC address can only be changed using a programming device. This is usually telecommunications equipment, such as IP-TV adapters or set-top boxes.

A modified MAC address is selected arbitrarily and may not contain an OUI (organizationally unique identifier) or device code.

In one example embodiment of the present invention, the system for locating lost electronic devices identifies the computer by its physical address (e.g., MAC address). The MAC address is accessible to computers on the same network segment. A network segment is part of a local network separated from others by IP-packet routers (third level in the OSI reference model). Within one segment, devices (personal computers, services, printers) may be connected using hubs, bridges, or switches. A segment is also called a subnetwork if the logical separation of a network corresponds to its physical separation. Computers located in different segments can exchange information. Information is transmitted using IP-packets.

Figure 2:
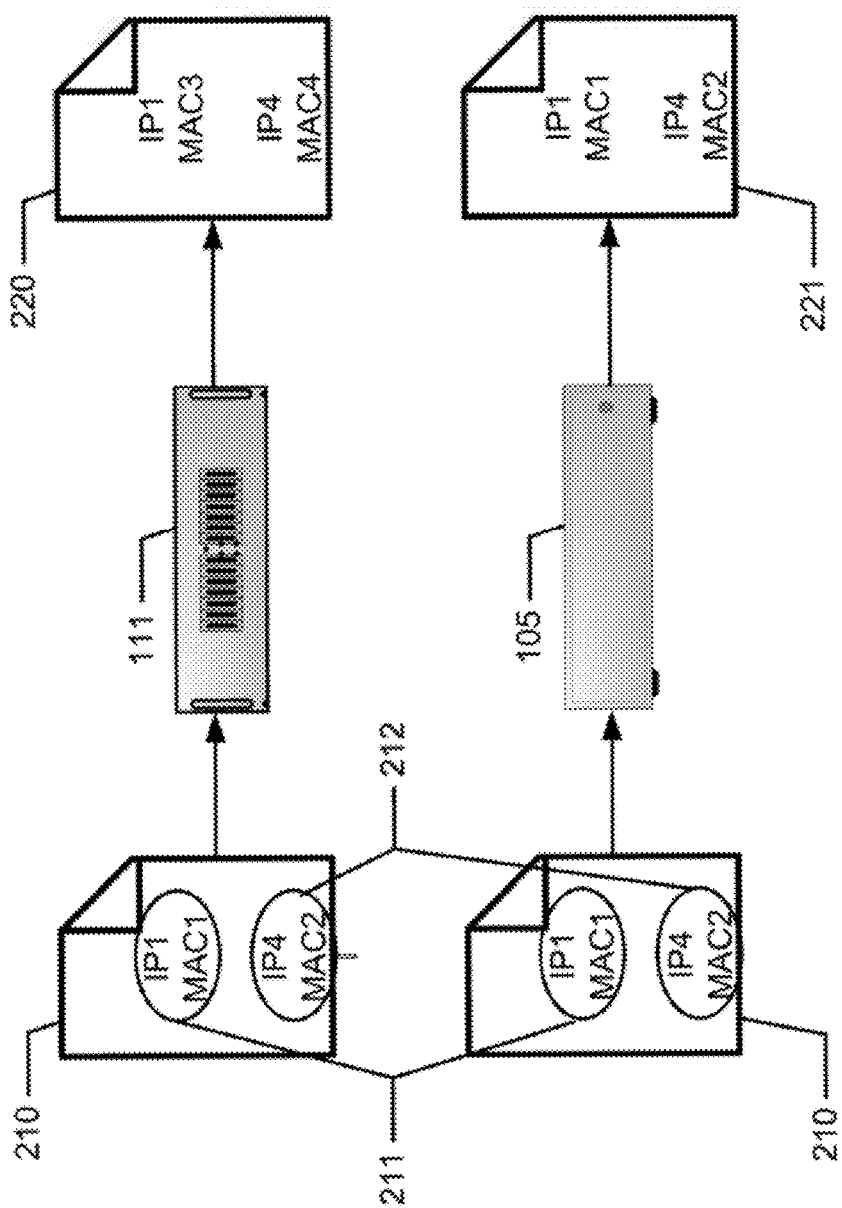
FIG. 2 illustrates how network packet headers change as they proceed through network devices.

FIG. 2 shows how network packet headers change as they proceed through network devices. The Figure shows devices operating on various levels of the OSI reference model: a router 111 and switch 105. An IP-packet 210 arrives at the input to each device. It contains the sender's network address IP1, the physical address of the sending device MAC1, the network address of the receiver IP4, and the physical address of the network device that will transmit the packet MAC2. IP1-MAC1 and IP4-MAC4 constitute the sender's 211 and receiver's 212 addresses, respectively. When the packet moves through the router, the sender's and receiver's physical addresses are replaced in the IP-packet 220, because packets are being transmitted on the next data transmission channel between the router and the receiver's computer device. As a result, at the output, the IP-packet 220 will contain the following information: IP1, MAC3, IP4, MAC4. A network-level device transmits packets by IP-address. The switch 105 has simpler operational logic; it transmits packets by physical address. Thus, the IP-packet 221 is not changed when proceeding through a switch or other network device on the data link level.

As can be seen in the FIG. 2, the physical address of the computer becomes inaccessible after moving through the router 111, but remains after the switch 105. This suggests that it is possible to search for a device on a local network by looking at the MAC addresses of devices connecting to this network in accordance with one example embodiment.

The prevalence of a product (e.g., applications or devices) adds another factor to its characteristics; this is the community's use of its capabilities. Several million users who are connected by a product may use the unlimited resources of the rest of the community by making small contributions. This trend is developing, together with the spread of the Internet and the increase in the number of services connecting people. It is used by cloud technologies and in distributed computing.

As before, there are not too many specialized services using community resources. Community resources are understood to be the computational power of computers connected into a single network, signed on to a single service, or having the installed the software of a single company.

The architecture of such systems is client-server or client-client. In the first case, client computers are synchronized and managed by a special server, which, depending on the complexity and objectives of the system, collects and analyzes information collected from clients and allocates new tasks. The second example is a client-client network system, in which the clients exchange information with one another without intermediaries. There are also examples using combinations of the two network configurations: when clients are synchronized and connected using a server and then interact directly and when a server designates tasks and clients connect and interact without the intervention of the server.

Information is exchanged according to standard data transmission protocols. Clients may maintain constant connections with one another or the server or may set up brief sessions.

The development of Internet communities is currently limited to data retrieval from client computers and is rarely expanded by using distributed computing or remote execution of tasks. An integral component of the systems reviewed is the existence of software or hardware modules installed into the user's computer. It may be a USB device, an operating system with special services, a separate application, or an add-on to a previously installed software product such as a browser or antivirus software. Having consented to participate in the community, the user links the module to the main operation of the computer, which can execute tasks to meet the community's goals, for example, part of a program can be launched on the computer, or the computer can operate as a proxy server for other clients.

The aggregate parameters of a user's computer, the serial number of the software product, its licensing information, and expiration dates comprise the user profile. Depending on the functions implemented in the system, the profile may contain different parameters and may be stored on a dedicated server. One implementation of this server could be a Web server, which provides and stores the necessary information about a user's computer. The user profile combined with the user authentication system is the user's account record, which may contain additional information, for example, the user's contact information.

In some communities, this profile fulfills a specific function: on social networks, it familiarizes community members directly with the user; on other services, it is used to determine generally accessible resources and means of loading them; yet on other services, it is used to optimize computations and test applications.

Still another application of the client's account record is to store a device's identifiers, together with its owner's contact information in accordance with one example embodiment. A central server may be configured to read and store necessary information about the device's hardware configuration in the client's personal account record, which also contains an electronic address in order to send notifications.

With respect to the system for detecting lost electronic devices, in accordance with one example embodiment, the account record may be used to store information about the computer's hardware and software configuration, including all possible identifiers: the serial number of the antivirus software, the physical addresses of network interfaces, and the hardware configuration of the computer (the type and model of the processor, mother board, video cards, RAM, adapters, etc.). This information is necessary so that, in the future, it is possible to find this computer when it connects to local and corporate networks.

An account record may store information on several computer devices. If one of them is lost or stolen, the owner will have to go to the website for his account record and indicate the device is lost. After this, the computer will be declared "wanted" within the community.

There are many methods to detect, block, and return lost or stolen mobile devices. Some solutions are based on remote control of the lost or stolen devices, provided by a remote control module installed on the lost or stolen devices. This allows for connection to a lost device when it is turned on or connected to the Internet. The necessary actions may then be taken: copy or remove important information', block access to the computer, and, if desired, make the computer inoperative.

Another known remote control method is based on connection through a mobile network. When a mobile device is lost or stolen, it can receive a signal (call from a specific number or coded SMS), which activates previously installed protective measures and carries out predefined actions on the lost or stolen device.

The most popular services implement a system, in which the mobile device is active. This is a big plus as compared to competing solutions, because, in this case, the device itself initiates the remote connection when it has the opportunity. If you keep in mind that in most cases of theft, the device is turned off, and the SIM card is taken from the mobile device, the ability to send a message or other control signal is out of the question. This type of system implies a client-server architecture. The owner of the device registers it on a server and launches a service. After this, each time the device connects to the Internet through a mobile (for example, GPRS), wired (Ethernet), or wireless (Wi-Fi) network, it requests its status from the server. If the status is "lost," the device carries out predefined actions and, if possible, communicates its location and connection parameters. This information is accessible by the legal owner (possessor of right) through the server's web interface or by electronic mail.

The system described for locating electronic devices is adapted for control actions. If a device is not able to connect to the server for a specific period of time, or a secret activity was not carried out (for example, repeat input of the password), the device is automatically blocked or carries out a customized command. However, such complexities in a device's functioning may make its intended daily use difficult.

Figure 3A:
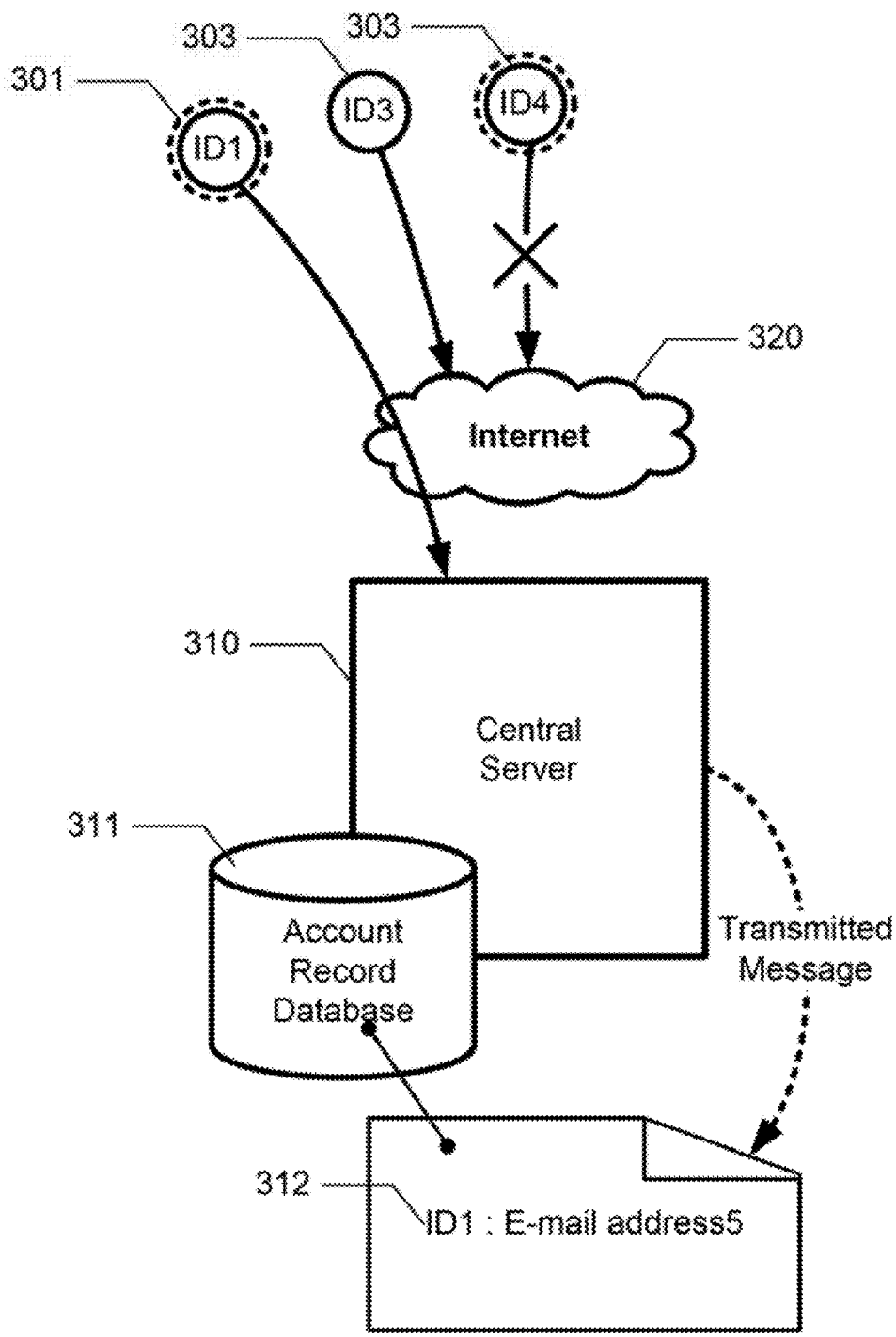
FIG. 3a illustrates a functional schematic of a prior art system for locating lost electronic devices.

FIG. 3a shows a functional schematic of a prior art system for locating lost electronic devices. The client 301 shown on the drawing as a dotted circle is an electronic device with an installed software agent that is connected to a central server 310. If the device is lost, the owner of this device notifies the central server 310 that the device is lost or stolen. The server 310 adds an identifier of the lost or stole device in a black list of lost or stolen devices maintained by the server. The owner then waits for his device to connect to a network and send a message concerning its location. When the lost or stolen device connects to the network 320, the client 301 automatically connects to the server 310, checks the black list of lost device identifiers, and compares them to its own identifier. If identifiers match, the client 301 recognizes that it has been lost or stolen. The client 310 then collects information about its connection and location and sends it to the server or directly to the owner. The owner's contact information is stored in an account record 312 in the account record database 311.

This system architecture above has significant deficiencies. FIG. 3a uses numbers 303 to indicate client devices registered on the central server, for which, after a theft, access to the Internet 320 was blocked or limited, software agent was removed, or technical components were partially replaced making it impossible to identify the device. Thus, devices, which do not have software agents or have modules that are severely restricted, cannot send information about their location to owners and therefore cannot be identified and found by the system.

Figure 3B:
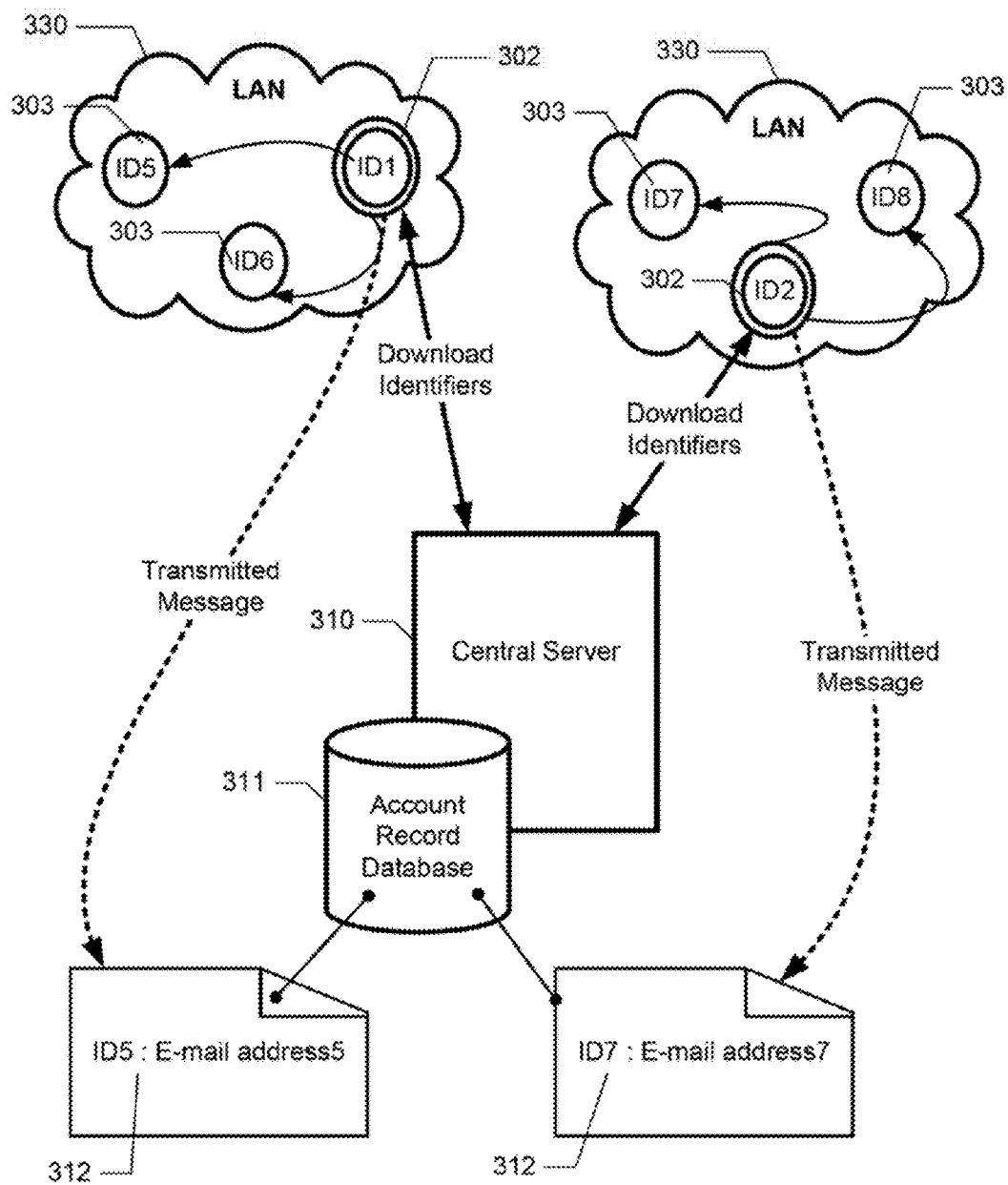
FIG. 3b illustrates a functional schematic of a system for locating lost electronic devices in accordance with one example embodiment of the invention.

FIG. 3b shows a functional schematic of a system for locating lost electronic devices using a community's resources in accordance with one example embodiment of the present invention. The system consists of a central server 310 and clients 302 and 303 that are connected to the server. Clients 302 are computer devices with installed software agents and the ability to connect by wired and wireless data transmission channels to the server 310 through the Internet. This implementation uses the TCP/IP stack as the connection standard.

The central server 310 stores information about user devices in an account record database 311. The user gains access to personal account records, for example, through a web interface: gets authorization to access the server and indicates the identifiers of his device, which are described above. Thus, the device is registered on the system for detecting lost electronic devices. Besides identifiers, the account record database 311 contains user contact information 312, such as user's electronic mail address, telephone number, or number for rapid message exchange. This information is bundled with devices to affiliate the computer or mobile device with its user, who can be contacted by the method indicated.

When the user discovers that a device, which has been registered in an account record, has been lost or stolen, he logs on to the central server 310 from any computer connected to the Internet 320 and notifies the server that the device has been lost or stolen. The system is immediately activated and begins to perform its primary search functions. Up to this point, the system represents a standard solution similar to those described above. The distinctive feature of this invention is the interaction between clients 302 connected to the server 310 both among themselves as well as with other electronic devices 303 collocated with the clients on a common local area network (LAN) 330 or other type of network.

All prior technologies would detect a device only if the memory hadn't been reformatted, programs hadn't been deleted, or the operating system hadn't been reinstalled. The system for locating lost electronic devices of the present invention operates differently. The system is operable to find lost or stolen electronic devices connected to the network even if system's software agents have been deleted from or disabled on the lost or stolen devices.

More specifically, FIG. 3b shows two devices 302 with identifiers ID1 and ID2, and four devices 303 with identifier ID5-ID8, respectively. In this case, devices ID1 and ID2 have installed software agents, which can be connected to the central system server 310. Suppose the user of device ID5 303 marked it as lost, and it needs to be found. In this case, lists of the identifiers of stolen (registered) devices are downloaded from the server 310 to connected clients 302. In one example embodiment, identifiers are the physical addresses of the network interfaces (e.g., MAC addresses). After the clients 302 receive the black lists of MAC addresses, they search for these devices on their local network 330 and in their connection histories.

In accordance with various example embodiments, the search process may active or passive. To detect a device 303 with an indicated MAC address on a network, the following condition must be fulfilled (for this implementation): devices should be located on a single segment of a local network. Subsequently, there are several possible solutions for determining MAC addresses on a network. The first option is to send an ARP query, which returns a physical address corresponding to the network address. This option assumes active scanning of the subnetwork by searching network addresses using a net mask and sending a query to each address. It is possible to search connected IP addresses by broadcast query and subsequently finding out the MAC address for each address. The deficiency of this method is that the needed device may be disconnected or not connected to the network at the time of the search. This deficiency is eliminated by periodic scanning of the network, but this increases the load on network switches. Specifically for this reason, before active scanning is begun, it is desirable to search through already existing connections. During data transmission within a single segment, network packets contain MAC addresses, which are stored in an ARP table (Windows OS). FIG. 4 shows an example of an ARP table. Physical addresses 402 of devices, which are connected to the computer or with which it is connected (a connection implies data packet transmission) through a network interface 401, are visible here. This table is a built-in resource of the operating system. The software agent may also maintain a log of physical address of connected devices and the connection time. This log may contain more information, especially taking into account the possibility of connecting a device to several local networks simultaneously. Verification of an identifier upon connection to a device without sending a special query is called passive scanning. It loads network switches and routers to a lesser degree.

When searching for a device, active and passive modes may be combined for optimal client operation.

The client 302 shown on FIG. 3b in the form of a double circle is a device that is registered on the server and connected to it. Other devices 303 (single circles) are computers or mobile devices, which are collocated with the client 302 on the same network segment.

Here is an example, in which a device ID1 302 is connected to a LAN 330, which is located on the same network segment with computers ID5 and ID6 303. Having connected to a central server 310, the software agent deployed on client 302 downloads a black list of MAC addresses of lost or stolen devices from server 310. First, the software agent of client 302 verifies whether MAC address of client 302 is on the black list 312. If its MAC address is on the black list, the software agent carries out predefined actions, such as determining location of the client device 302 and sends this information to the legitimate user. The probability of such an outcome is very small, because it is possible only if the criminal connected to the Internet 320 without changing device's 302 software or hardware configuration.

Suppose that the black list has an item 312 with the identifier ID5. This indicates that this device was stolen or lost and not returned. In this case, the criminal used this device to connect to the local network 330. Because client ID5 did not communicate information about its location, by all appearances, the installed software agent was removed or disabled, or access to the Internet was restricted. This means that device ID5 303 is no longer a client, because it cannot connect to the central server 310. Using prior art techniques, there would be no results from a search for this device. This invention however allows for device ID5 303 to be found using client ID1 302. In particular, the software agent installed in the client 302 will search all devices collocated on its network 330 using MAC address of the lost or stolen device. If the lost device is found, the software agent may collect all possible information about that device including the local address, time of detection, gateway address, external network address of the network, and location information. The software agent may then send the collected information to the central server 310 or directly to the legal owner of the lost device.

In one example embodiment, the collected information about the lost or stolen device may be used to locate the device. For example, the external network address of the lost or stolen device may be used to determine the network service provider (NSP), because all real IP-addresses are registered, and their issuance is precisely regulated. By appealing to the NSP and indicating the local network address of the lost or stolen device, it's possible to accurately determine the user of the lost or stolen device. This requires logging of all network connections and mandatory registration of the user's identity or, at least, the connection location. As a rule, NSP do this. Investigatory activities are outside the framework of this invention and are mentioned to disclose a possible application of the system for locating lost electronic devices.

In another example embodiment, the location of the device may determined by activating, by the software agent deployed on the devices, device's satellite navigation system (such as GPS or GLONASS). If the device does not have a satellite navigation module, location can still be determined by other means but with a higher degree of error. For example, if the device has a mobile communication module (GSM), its location can be determined by measuring the signal level received by the closest three signal relay stations. Thus, the location of a mobile device can be determined in space with respect to these stations.

Yet in another example embodiment, the coordinates of Ethernet routers, wireless access points, cellular base stations in networks 330 may be collected, for example, using satellite navigation system of devices 302 when these devices are connected to the networks, and recorded on the server 310. The server than determines locations of all devices connected to the network using the collected coordinates of Ethernet routers, wireless access points, cellular base stations. In this case, the location of lost or stolen electronic device may be determined with less accuracy than using satellite navigation system of the lost device itself, but higher than the accuracy in tracing external network address described above.

Figure 5A:
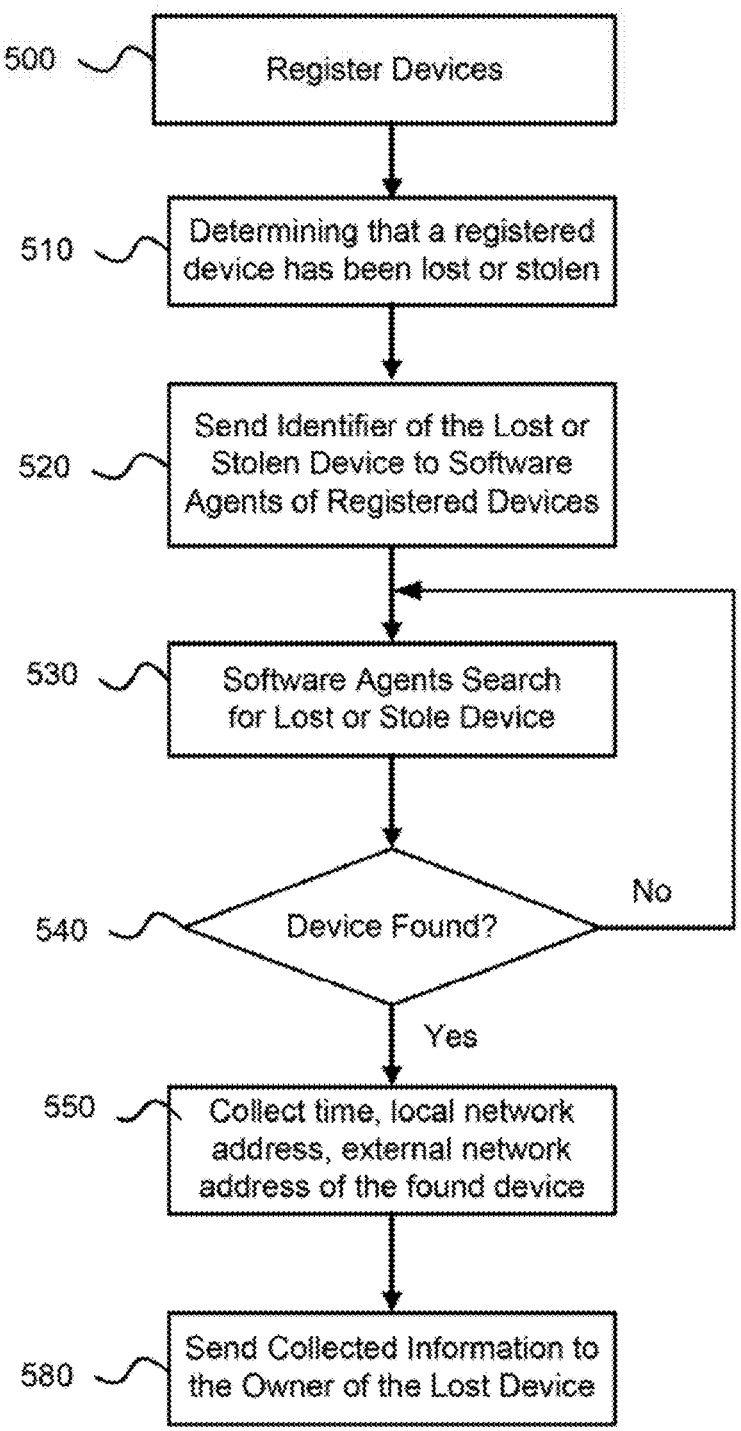
FIG. 5a illustrates a method for detecting lost electronic devices in accordance with one example embodiment of the present invention.

FIG. 5a shows a method for detecting lost electronic devices in accordance with one example embodiment. Steps 500 through 580 comprise the system's complete operational cycle. This cycle may be repeated until the owner no longer indicates that the device is lost or the license for the service expires. After this, the device will be removed from the black list. The number of repetitions may be explicitly limited by a preset number (10-100 alerts). The method for detecting lost electronic devices begins with step 500, during which devices are registered with the central server. During registration, identifiers of the registered devices are indicated or automatically read, and stored in the owner's account record. If an electronic device is lost, the owner indicates the loss/theft, or a defensive rule is automatically triggered, which records the loss/theft, for example if a password is incorrectly entered during step 510. The interaction of the owner with the central server may, in one possible implementation, be carried out through a web interface. Owner's registration may be done by an operator who knows the information needed for authorized access to the account record. After the device's loss is noted, in step 520, the central server generates and transmits to clients connected to the server a black list of identifiers of lost or stolen devices. Subsequently, in step 530, clients search for the device on their local networks using the identifiers of lost or stolen devices indicated on the black list. Searches for these identifiers are performed until the device is found or the black list of devices is updated. When the lost device is found, the time it was detected and information needed to determine the location of this device is recorded in step 550. For example, this data may include local network address, time of detection, and the external address of the network. If the client has a GPS module, its GPS coordinates may be also recorded. The collected information may be sent at step 580 to the legal owner using owners contact information, for example, an electronic mail address or mobile telephone number. Alternatively, the collected information may be sent to the central server, which will notify the owner of the lost or stolen device that his/her device was found.

Figure 5B:
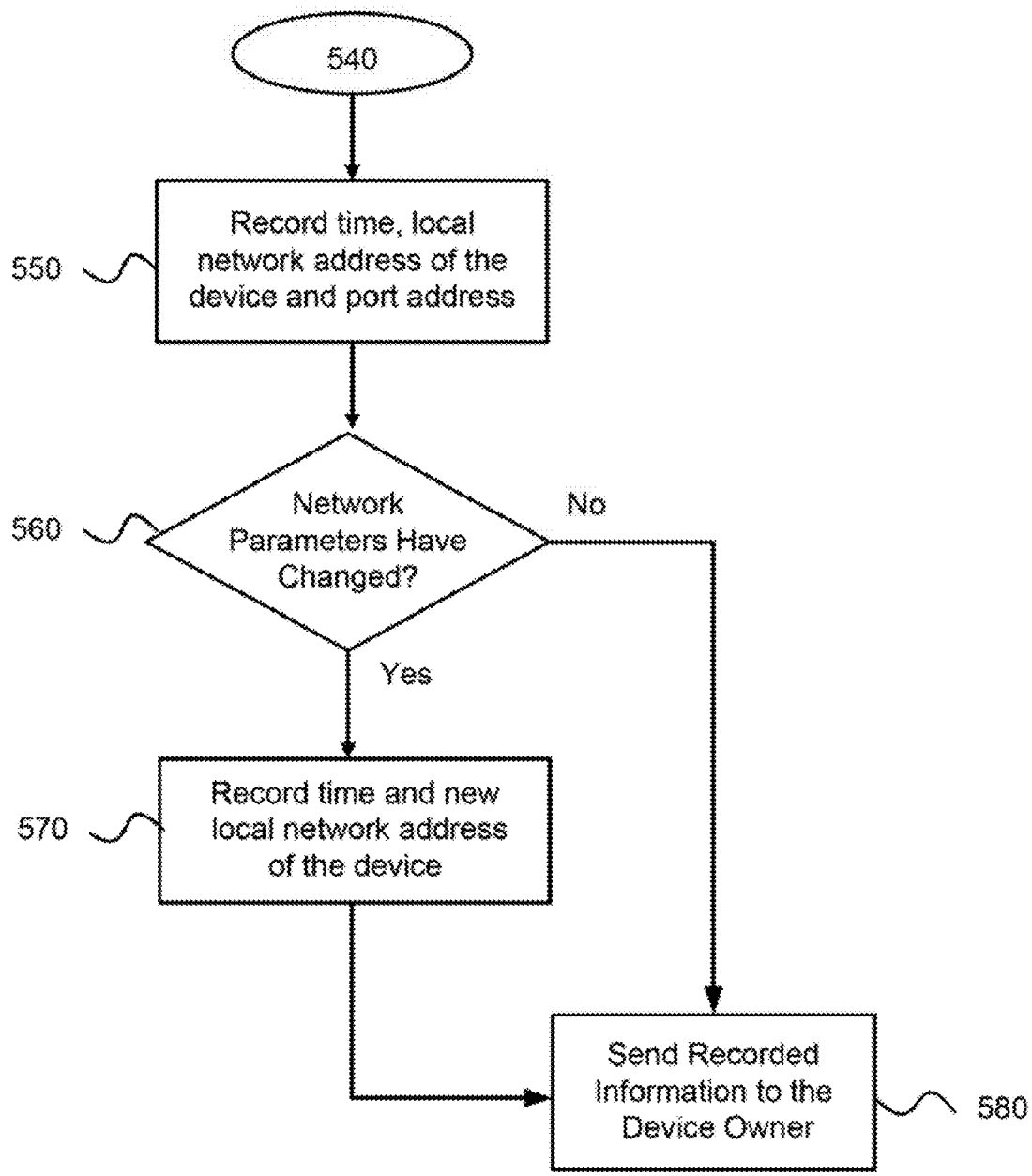
FIG. 5b illustrates a method for tracking the movement of lost electronic devices in accordance with one example embodiment of the present invention.

The search for the lost or stolen device may be more complex if the local network addresses are dynamically assigned to the devices connected to the network. In this case, the method in FIG. 5a has additional steps, 560 and 570, which are shown in FIG. 5b. If the client device determines that connection parameters, such as local network address, computer name on the network, subnetwork mask, or external address of the network, of the lost or stolen device have changed at step 560, the new information may be recorded by the client at step 570 and sent to the device owner or the central server in an analogous fashion.

Having received notification that the device was found, the user may turn to the police or other administrative bodies to carry out investigatory activities using the obtained information, which is sufficient to identify the current position of the lost device. After the device is found, the user may remove the note concerning loss of the device from the server; the record is removed from the black list; and the device is no longer involved in searches.

Figure 6:
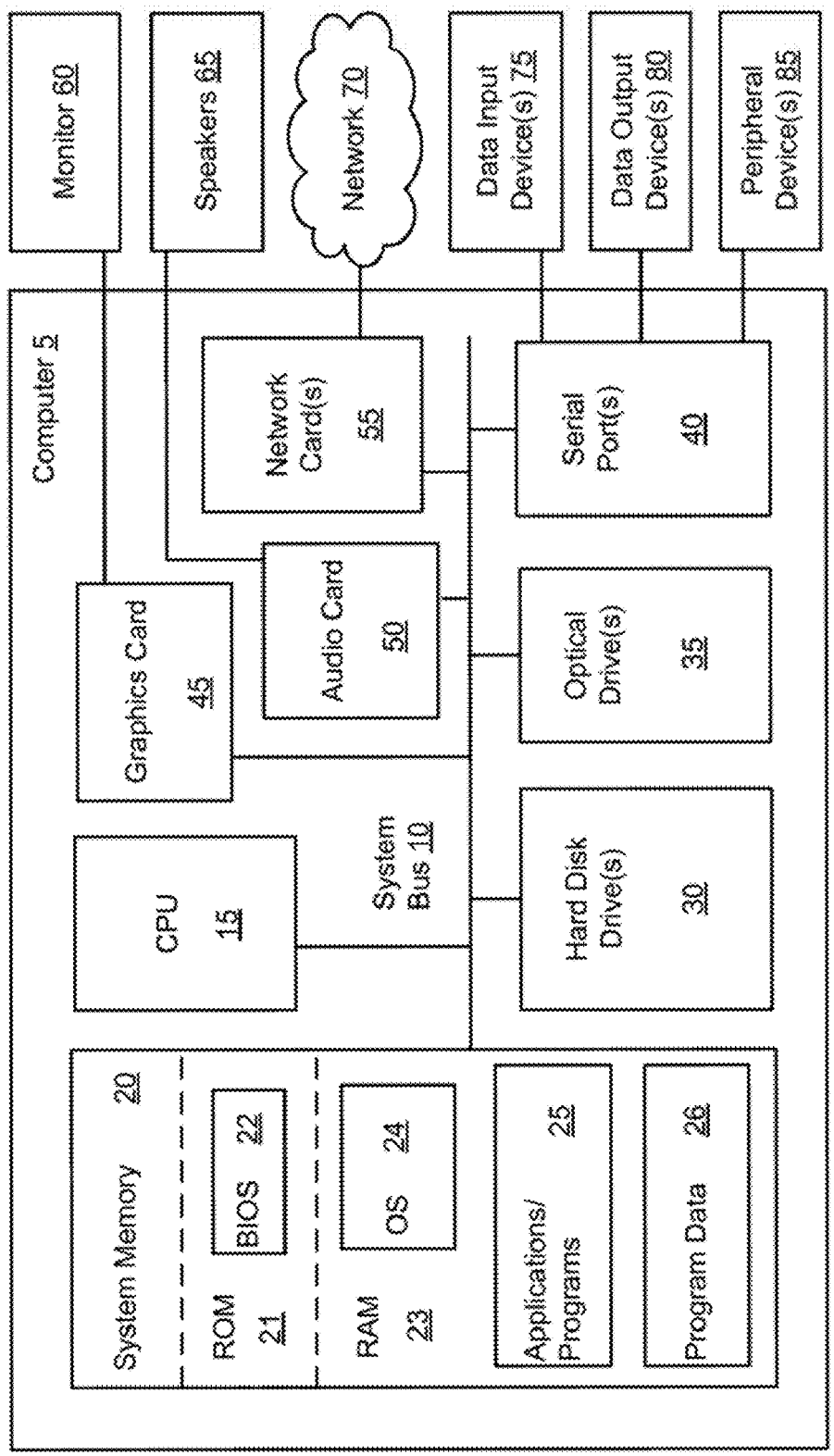
FIG. 6 illustrates a general purpose computer system in accordance with one example embodiment of the present invention.

FIG. 6 depicts an example embodiment of a central server 5 which may be used for locating lost or stolen electronic devices. Server 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

Figure 7:
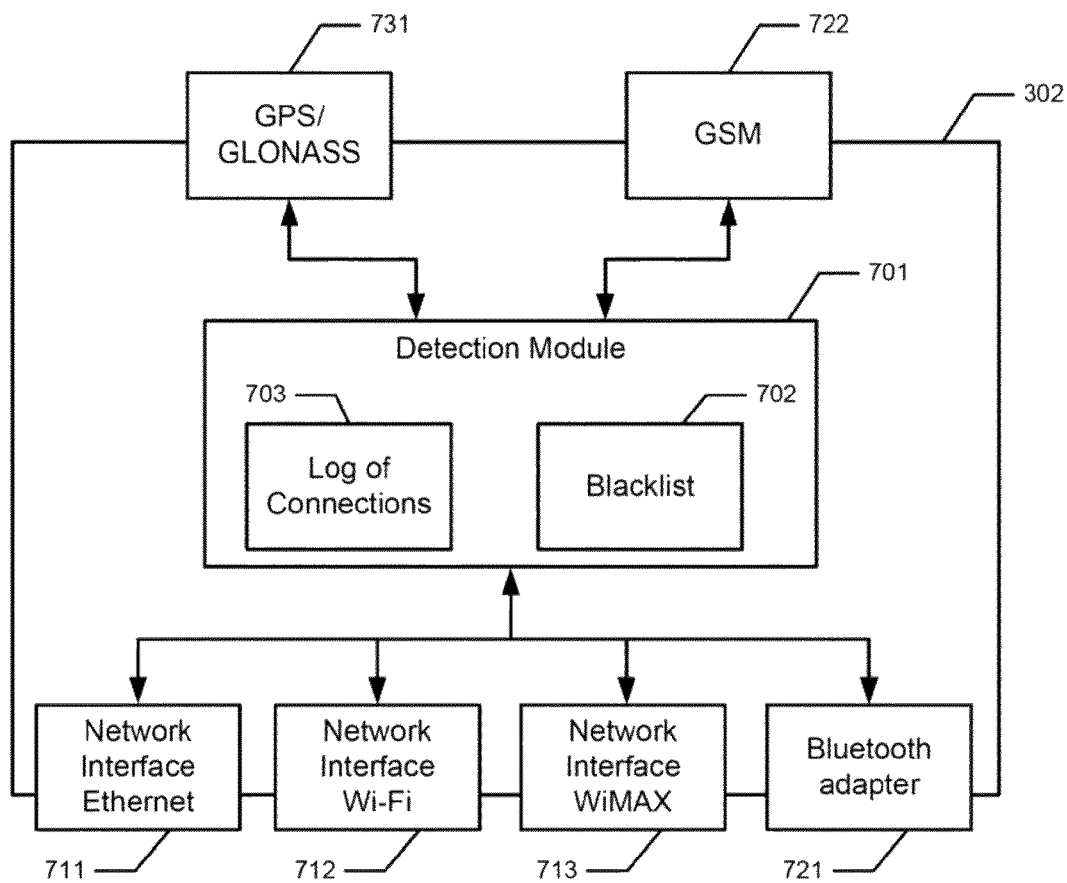
FIG. 7 illustrates the structural schematic of a client in accordance with one example embodiment of the present invention.

FIG. 7 depicts the structural schematic of a client with one possible system configuration. The client may include a personal computer, a notebook, a tablet, a smart phone, a media receiver or other types of electronic device. The feature of this client is the presence of a detection module 701, which may be a hardware addition that is built-in or connected to the system card by a USB, PCI, COM, or other interface. It may also be implemented as a separate end-user application, software retrofit, or system service installed in the client. This module, independent of its implementation, can manage connections (Ethernet 711, Wi-Fi 712, WiMAX 713, DSL modem, Bluetooth 721, GSM 722) and navigation modules 731 (GLONASS, GPS).

The detection module stores a local list 702 of lost device identifiers downloaded from a central server 310, and checks items from the list 702 for matches (devices accessible for data transmission using the installed connection methods) in the client's network neighborhood and with the client's own parameters 302 (if the client 302 was stolen). If a match is found, the time of detection and parameters directly or indirectly identifying the geographic position of the found device are recorded. After this, the client 302 sends this information to the central server, continues to monitor the position of the detected device, and searches the remainder of the black list 702. Independent of the search, the detection module maintains a connection log 703 recording the time, physical addresses of devices connected at that time, and other parameters, for example, the quantity of network packets sent, time of the active connection, and information obtained from the device. After the black list 702 is updated, a search is done primarily through the connections log 703. Later, active connections are analyzed, and network connections are scanned.

As technology advances, there are more and more data transfer methods, which are used in general-purpose electronic devices such as smart phones, portable computers, and PDAs. A modern device can connect simultaneously to different computer networks using wired and wireless connection modules. More and more notebooks and smart phones are equipped with WiMAX IEEE 802.16 modules while retaining the ability to connect through standard Wi-Fi adapters (IEEE 802.11). Several PDAs, tablet computers, and the majority of computers are equipped with network cards for connection to Ethernet networks (IEEE 802.3). This type of connection appeared earlier than the other standards enumerated above, and is the most widely distributed and reliable connection method.

Taking into account the above trends, a modern device may connect to the Internet simultaneously using several different connections/interfaces. Clients may use inactive wireless interfaces to create open networks to lure criminals.

The number of free wireless Internet access points is continually growing, but the majority of these are closed (encrypted). This, without a doubt, makes them more secure, but it also reduces their attractiveness and accessibility. Therefore, according to one example embodiment, a software agent deployed on the client is configured to operate the client as an open wireless access point and to scan for connected devices that have been lost. This increases the probability that these devices are detected and the criminals caught.

To detect a lost device, it must be within the range of the access point. To identify the device on a wireless connection, it is not necessary to connect to an open network. Thus, in another embodiment, the access point may also be closed (protected). Devices with installed and active (turned on) Wi-Fi modules may be detected without being connected to a network, because the wireless module periodically scans for wireless connection points in its range. A similar operation mode is built in to most devices and quickly lists accessible networks using a broadcast query, which is intercepted by the client and enables the devices to be detected.

Figure 8:
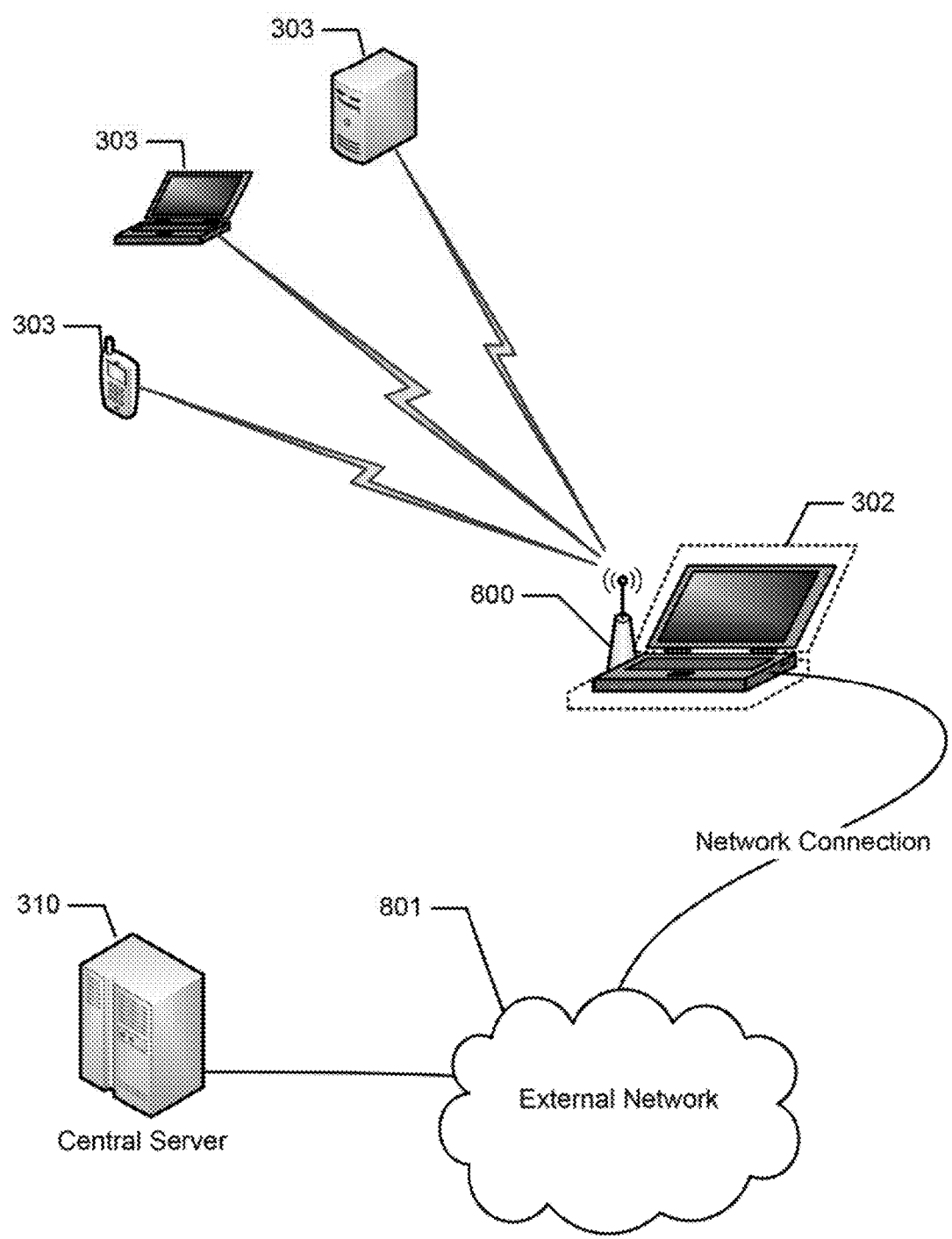
FIG. 8 illustrates a functional schematic of the system's operation during an active search for a device by the client in accordance with one example embodiment of the present invention.

FIG. 8 shows the functional schematic of a client 302 connected to an external network 801 using one of its network interfaces. This network may be a dedicated Internet connection, a home or corporate network, or satellite or mobile Internet. This connection may be inactive at this time, but should be subsequently re-established to connect the client with the central server 310 if a device from the black list is detected. If while the client is in operation, one of its wireless network adapters is inactive, an open access point is automatically created. An open access point is understood to be a network node permitting unencrypted connection to all devices that issue connection queries (without indicating a password). The identifier of a network adapter that is connected to a network can already be determined during a connection query and subsequently during an exchange of network packets.

Having created an open wireless access point, the client tracks devices 303 that attempt to connect to its network. Because clients create new open networks, the coverage of network neighborhoods is increased, thereby increasing the number of computers being checked and the number of lost devices detected. Devices checked may be not only computers, but also mobile telephones, smart phones, PDAs, and other portable devices with a wireless connection adapter. After a device on the black list has been detected, the client records the time and place. These are then sent to the central server or the legal owner of the found device. The client may record the connection parameters of the recovered device (or its own connection parameters) and coordinates, if the client is equipped with a navigation system. As an add-on, the client may also indicate the type of connection and the signal level received from the device to determine the distance between them. It is possible to determine the user's location using methods described above: satellite navigation, tracing a mobile signal, or using the address of the provider if connected through the Internet. Depending on the method used, the accuracy of the location will vary from a half meter to several hundred meters. The accuracy of the location will be improved if the device is locked in by several clients during the same period of time.

In accordance with another example embodiment, a client may create a closed access point to detect a lost or stolen device. The system will work, because devices with activated network interfaces periodically scan networks to create a list of accessible access points or devices, for example, using Bluetooth. A broadcast query contains the identifier of the device that generated it. As a result, a client located in the range of the network adapter of a detectable device receives a broadcast query and can determine whether this device is lost.

If the client does not create an access point, he/she can eavesdrop on the network environment themselves. For wireless networks, the data transmission channel is the air, which permits network traffic to be recorded. Protected networks encode data transmissions, but device identifiers are accessible. This makes it possible to find lost devices on a network without the client directly connecting to it.

Besides storing account records, downloading black lists, and collecting information about found devices, the central server also analyses the information it receives. In one example embodiment, the central server's analyses consist of: correlating events in time, plotting a device's movements, making a timetable for a device's network connections, etc.

Central processors collect data from clients about events connected with the identification of devices. Events are described using the time and device's location at this time. Theoretically, the MAC addresses of some devices may coincide (resulting from changes to some of them), and there is a chance that one device will be detected by several clients. In fact, clients, each having detected a device using a certain identifier, may actually have detected one and the same device. In this case, the accuracy of the location is improved. When several notifications are received during the same period of time, differentiating between a false response and detection of a lost device can only be done using logic rules. These rules, for example, may establish an allowable detection area for several devices. A rule may have the form "if devices detecting an identifier on the black list are located at a radius of S kilometers from one another and the difference in detection times does not exceed S/V (with a velocity V), then combine the device information into a single incident connected with a single device, otherwise review each event as a separate incident."

When different locations for a device have been detected at different times, the device's path can be established by connecting points on the coordinate plane in chronological order. It is additionally possible to determine and indicate the direction of motion and velocity. This makes it possible to predict the device's position by the next point in time.

Like any person, a criminal has a daily routine and may connect to a specific network with a defined frequency. If the central server discovers the frequency of connections to a specific network, it is possible to say, with some degree of certainty, that the device will connect to the network according to a predicted schedule. In this case, the central server analyzes changes to the network address, network type, and other information impacting the accuracy of the prediction.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for locating lost or stolen electronic devices, the method comprising:
   deploying a software agent on a first mobile electronic device;
   receiving by the software agent a message from a remote server, the message including an identifier of a lost or stolen electronic device;

operating the first mobile electronic device, by the software gent, as an open wireless access point that creates an open wireless network accessible to one or more second collocated mobile electronic devices including lost or stolen electronic devices;

using the received device identifier to search by the software agent on the open wireless network created by the first mobile electronic device, for the lost or stolen electronic device among a plurality of second mobile electronic devices connected to the open wireless network;

if the lost or stolen electronic device is located among the plurality of second mobile electronic devices connected to the open wireless network, collecting by the software agent information about the located lost or stolen electronic device; and transmitting by the software agent the collected information to one of the remote server or an owner of the lost or stolen electronic device.

2. The method of claim 1, wherein the identifier of the lost or den electronic device includes a physical address of at least one network interface of the lost or stolen device.

3. The method of claim 2, wherein the physical address of a network interface includes a Medium Access Control (MAC) address of the electronic device.

4. The method of claim 1, wherein searching for the lost or stolen electronic device includes: searching for the identifier of the lost or stolen device in a list of identifiers of second mobile electronic devices that communicated through the network with the first mobile electronic device.

5. The method of claim 4, wherein the list of identifiers is an Address Resolution Protocol (ARP) table stored in a memory of the first electronic device.

6. The method of claim 1, wherein searching for the lost or stolen electronic device includes: broadcasting by the first electronic device ARP queries to the plurality of second mobile electronic devices in the network, and receiving ARP responses from one or more of the plurality of second mobile electronic devices connected to the network, wherein each response includes an identifier of a second mobile electronic device, which transmitted said response.

7. The method of claim 1 wherein the collected information includes one or more of time of detection of the lost or stolen electronic device, local network address of the lost or stolen electronic device, gateway address of the lost or stolen electronic device, external network address of the lost or stolen electronic device, and geographic location of the of the lost or stolen electronic device.

8. A computer system for locating lost or stolen electronic devices, the system comprising:

a first mobile electronic device comprising a processor and a memory;

the memory storing a software agent executable by the processor and configured to:

receive a message from a remote server, the message including an identifier of a lost or stolen electronic device;

operate the first mobile electronic device as an open wireless access point that creates an open wireless network accessible to one or more second collocated mobile electronic devices, including lost or stolen electronic devices, using the received device identifier to search on the open wireless network created by the first mobile electronic device, for the lost or stolen electronic device among a plurality of second mobile electronic devices connected to the open wireless network;

if the lost or stolen electronic device is located among the plurality of second mobile electronic devices connected to the open wireless network, collect information about the located lost or stolen electronic device; and transmit the collected information to one of the emote server or an owner of the lost or stolen electronic device.

9. The system of claim 8, wherein the identifier of the lost or stolen electronic device includes a physical address of at least one network interface of the lost or stolen device, wherein the physical address includes a Medium Access Control (MAC) address.

10. The system of claim 8, wherein to search for the lost or stolen electronic device, the software agent being further configured to search for the identifier of the lost or stolen device in a list of identifiers of second mobile electronic devices that ccarrarnunicated through the network with the first mobile electronic device, wherein the list of identifiers is an Address Resolution Protocol (ARP) table.

11. The system of claim 8, wherein to search for the lost or stolen electronic device, the software went being further configured to broadcast ARP queries to the plurality of second mobile electronic devices in the network, and receive ARP responses from one or more of the plurality of second mobile electronic devices, wherein each response includes an identifier of a second mobile electronic device, which transmitted said response.

12. The system of claim 8, wherein the collected information includes one or more of time of detection of the lost or stolen electronic device, local network address of the lost or stolen electronic device, gateway address of the lost or stolen electronic device, external network address of the lost or stolen electronic device, and geographic location of the of the lost or stolen electronic device.

13. A computer program product embedded in a non-transitory computer-readable storage medium, the computer-readable storage medium comprising computer-executable instructions for locating lost or stolen electronic devices, the instructions for:

deploying a software agent on a first mobile electronic device;

receiving by the software agent a message from a remote server, the message including an identifier of lost or stolen electronic device;

operating the first mobile electronic device, by the software agent, as an open wireless access point that creates an open wireless network accessible to one or more second collocated mobile electronic devices, including lost or stolen electronic devices;

using the received device identifier to search by the software agent on the open wireless network created by the first mobile electronic device, for the lost or stolen electronic device among a plurality of second mobile electronic devices connected to the open wireless network;

if the lost or stolen electronic device is located among the plurality of second mobile electronic devices connected to the open wireless network, collecting by the software agent information about the located lost or stolen electronic device; and transmitting by the software agent the collected information to one of the remote server or an owner of the lost or stolen electronic device.

14. The product of claim 13, wherein the identifier of the lost or stolen electronic device includes a physical address of at least one network interface of the lost or stolen device, wherein the physical address includes a Medium Access Control (MAC) address.

15. The product of claim 13, wherein instructions for searching for the lost or stolen electronic device include instructions for searching for the identifier of the lost or stolen device in a list of identifiers of second mobile electronic devices that communicated through the network with the first mobile electronic device, wherein the list of identifiers is an Address Resolution Protocol (ARP) table.

16. The product of claim 13, wherein instructions for searching for the lost or stolen electronic device include instructions for broadcasting by the first mobile electronic device ARP queries to the plurality of second mobile electronic devices in the network, and receiving ARP responses from one or more of the plurality of second mobile electronic devices connected to the network, wherein each response includes an identifier of a second mobile electronic device, which transmitted said response.

17. The product of claim 13, wherein the collected information includes one or more of time of detection of the lost or stolen electronic device, local network address of the lost or stolen electronic device, gateway address of the lost or stolen electronic device, external network address of the lost or stolen electronic device, and geographic location of the of the lost or stolen electronic device.

* * * * *